United States Patent
Tung et al.

(10) Patent No.: US 9,513,491 B2
(45) Date of Patent: Dec. 6, 2016

(54) 3D IMAGE DISPLAY DEVICE AND 3D IMAGE DISPLAY METHOD

(71) Applicant: AU Optronics Corp., Hsin-Chu (TW)

(72) Inventors: Kuan-Yu Tung, Hsin-Chu (TW); Hsin-Ying Wu, Hsin-Chu (TW); Li-Min Chen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 43 days.

(21) Appl. No.: 14/542,646

(22) Filed: Nov. 16, 2014

(65) Prior Publication Data
US 2015/0323803 A1    Nov. 12, 2015

(30) Foreign Application Priority Data
May 12, 2014    (TW) .............................. 103116749 A (51) Int. Cl.
*G02B 27/26*    (2006.01)
*G02B 27/22*    (2006.01)

(52) U.S. Cl.
CPC ........... *G02B 27/26* (2013.01); *G02B 27/2214* (2013.01)

(58) Field of Classification Search
CPC ..................... H04N 13/0409; H04N 13/0431; H04N 13/0434; H04N 13/0436; H04N 13/0438; H04N 13/0429; G02B 27/22; G02B 27/2228; G02B 27/2264; G02B 27/26; G02B 27/28
USPC ................ 359/462–467, 471, 473, 475, 476, 359/486.02, 458, 483.01–494.01; 348/369; 349/4–18, 78, 83, 108
See application file for complete search history.

(56) References Cited

U.S. PATENT DOCUMENTS

| | | | | |
|---|---|---|---|---|
| 6,046,849 A | * | 4/2000 | Moseley | G02B 5/3016 348/57 |
| 2010/0033680 A1 | * | 2/2010 | Krijn | G02B 27/2214 353/8 |
| 2011/0317129 A1 | | 12/2011 | Hsu | |

FOREIGN PATENT DOCUMENTS

CN    101568873 A    10/2009

* cited by examiner

*Primary Examiner* — Ricky Mack
*Assistant Examiner* — Mustak Choudhury
(74) *Attorney, Agent, or Firm* — McClure, Qualey & Rodack, LLP (57) ABSTRACT

A 3D image display device includes an image projection unit for projecting a first image; a first polarization unit disposed on a projection path of the first image for linearly polarizing the first image to have a first linear polarization direction; a lens array disposed on the projection path of the first image for refracting an image having a second linear polarization direction, the second linear polarization direction being different from the first linear polarization direction; a first quarter-wave plate disposed on the projection path of the first image for converting polarization direction of an image between a linear polarization direction and a circular polarization direction; and a reflection unit disposed on the projection path of the first image for reflecting the first image transmitted from the first quarter-wave plate back to the first quarter-wave plate.

11 Claims, 11 Drawing Sheets

3D IMAGE DISPLAY DEVICE AND 3D IMAGE DISPLAY METHOD

BACKGROUND OF THE INVENTION

1. Field of the Invention

The present invention relates to a 3D image display device and a 3D image display method, and more particularly, to a 3D image display device and a 3D image display method capable of improving image forming quality of a 3D image.

2. Description of the Prior Art

Figure 1:
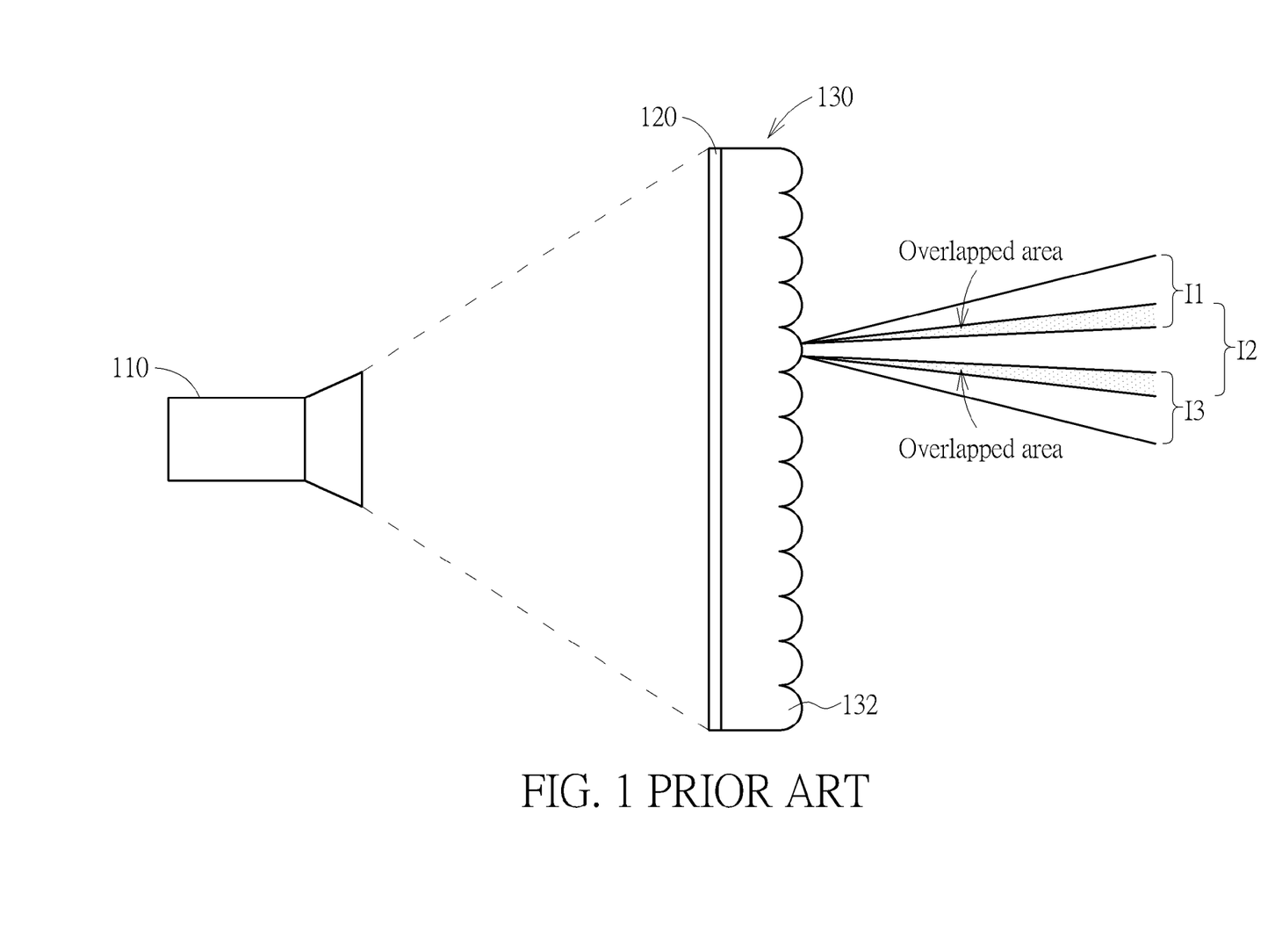
FIG. 1 is a diagram showing a 3D image display device of the prior art.

Please refer to FIG. 1. FIG. 1 is a diagram showing a 3D image display device of the prior art. As shown in FIG. 1, the 3D image display device 100 of the prior art comprises an image projection unit 110, a scattering element 120, and an optical element 130. The image projection unit 110 is configured to project a plurality of sub-images I1, I2, I3 having different visual angles onto the scattering element 120. A lens array 132 is formed on the optical element 130 for refracting the plurality of sub-images I1, I2, I3 having different visual angles to corresponding display directions respectively, so as to allow a user to see the corresponding sub-images from different viewing angles, such that a 3D image is visually formed to the user.

A distance between the lens array 132 and the scattering element 120 is approximately equal to a focal length of the lens array 132. The focal length of the lens array 132 relates to an overlapping level between the sub-images I1, I2, I3 having different visual angles. When the focal length of the lens array 132 is shorter, the overlapping level between the sub-images I1, I2, I3 having different visual angles is greater, such that image forming quality of the 3D image is decreased. However, in order to increase the focal length of the lens array 132 for improving the image forming quality of the 3D image, thickness of the optical element 130 is required to increase correspondingly, such that the 3D image display device 100 becomes thicker. The 3D image display device 100 of the prior art is not able to reduce the thickness of the optical element and improve the image forming quality of the 3D image at the same time.

SUMMARY OF THE INVENTION

The embodiment of present invention provides a 3D image display device comprising an image projection unit, a first polarization unit, a lens array, a first quarter-wave plate, and a reflection unit. The image projection unit is configured to project a first image. The first polarization unit is disposed on a projection path of the first image for linearly polarizing the first image to have a first linear polarization direction. The lens array is disposed on the projection path of the first image for refracting an image having a second linear polarization direction. The second linear polarization direction is different from the first linear polarization direction. The first quarter-wave plate is disposed on the projection path of the first image for converting polarization direction of an image between a linear polarization direction and a circular polarization direction. The reflection unit is disposed on the projection path of the first image for reflecting the first image transmitted from the first quarter-wave plate back to the first quarter-wave plate. Wherein, the first image sequentially passes through the first polarization unit, the lens array, the first quarter-wave plate, and the reflection unit, and the first quarter-wave plate converts the first image reflected by the reflection unit to have the second linear polarization direction, so as to allow the first image having the second linear polarization direction to pass through the lens array.

The other embodiment of present invention further provides a 3D image display method comprising projecting a first image along a projection path; linearly polarizing the first image to have a first linear polarization direction; converting the first image having the first linear polarization direction into a first image having a first circular polarization direction; a reflection unit reflecting the first image having the first circular polarization direction and converting polarization direction of the first image from the first circular polarization direction to a second circular polarization direction; converting the first image having the second circular polarization direction into a first image having a second linear polarization direction, the second linear polarization direction being different from the first linear polarization direction; and the lens array refracting the first image having the second linear polarization direction.

The other embodiment of present invention further provides a 3D image display device comprising an image generating unit configured to generate a first image; and a lens array disposed on a projection path of the first image for refracting the first image in order to generate a 3D image; wherein a pixel of a real image of the first image satisfies the following equation: $\tan(b) \times d > \partial$; wherein $\partial$ is a pixel width of the real image of the first image, b is a light divergence angle of the pixel, d is an equivalent optical path length (OPD) in air from a pixel of the real image of the first image to the lens array.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
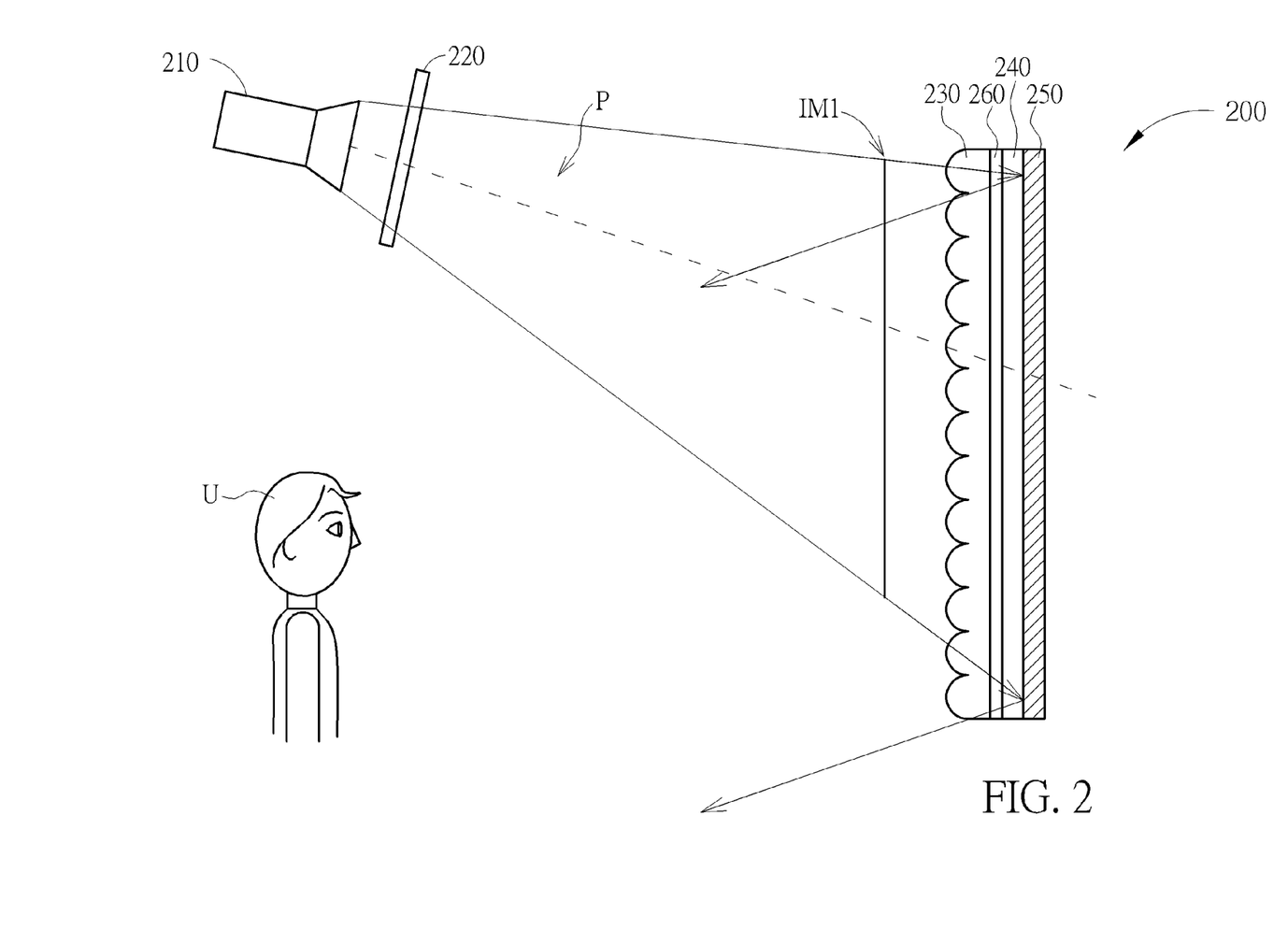
FIG. 2 is a diagram showing a 3D image display device according to a first embodiment of the present invention.
Figure 3:
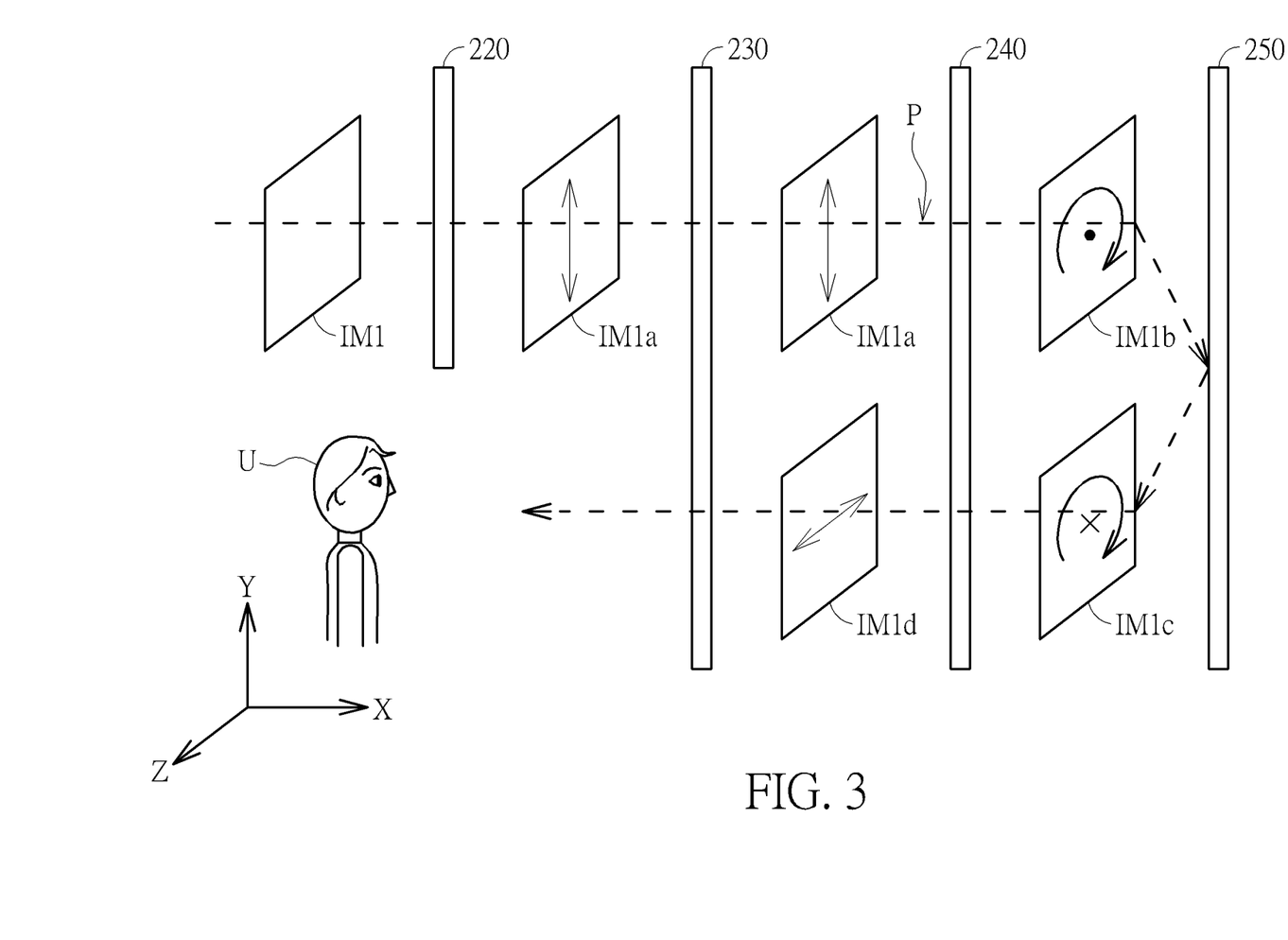
FIG. 3 is a diagram showing an optical element in FIG. 2 converting a polarization direction of a first image.

Please refer to FIG. 2 and FIG. 3. FIG. 2 is a diagram showing a 3D image display device according to a first embodiment of the present invention. FIG. 3 is a diagram showing an optical element in FIG. 2 converting a polarization direction of a first image. As shown in figures, the 3D image display device 200 of the present invention comprises an image projection unit 210, a first polarization unit 220, a lens array 230, a first quarter-wave plate 240, and a reflection unit 250. The image projection unit 210 is configured to project a first image IM1 along a projection path P. A real image of the first image IM1 is formed before arriving at the reflection unit 250 on the projection path P. The first image IM1 comprises a plurality of sub-images having different visual angles. Each sub-image corresponds to a view of the 3D image at a specific angle. The first polarization unit 220 is disposed in front of the image projection unit 210 on the projection path P of the first image for converting the first image IM1 into a first image IM1a having a first linear polarization direction (such as Y-axis direction). The lens array 230 is disposed on the projection path P of the first image for refracting an image having a second linear polarization direction (such as Z-axis direction). The second linear polarization direction is different from the first linear polarization direction. As such, when the first image IM1a having the first linear polarization direction passes through the lens array 230 along the projection path P, the first image IM1a having the first linear polarization direction is not refracted by the lens array 230.

The first quarter-wave plate 240 is disposed on the projection path P of the first image. An angle between a slow axis direction of the first quarter-wave plate 240 and the first linear polarization direction is 45 degrees or 135 degrees. The first quarter-wave plate 240 is configured to convert a polarization direction of an image between a linear polarization direction and a circular polarization direction. For example, when an image having a liner polarization direction passes through the first quarter-wave plate 240, the first quarter-wave plate 240 converts the image having the linear polarization direction into an image having a circular polarization direction; and when an image having a circular polarization direction passes through the first quarter-wave plate 240, the first quarter-wave plate 240 converts the image having the circular polarization direction into an image having a linear polarization direction. Therefore, when the first image IM1a having the first linear polarization direction passes through the first quarter-wave plate 240 along the projection path P, the first image IM1a having the first linear polarization direction is converted by the first quarter-wave plate 240 into a first image IM1b having a first circular polarization direction. The reflection unit 250 is disposed on the projection path P of the first image for reflecting the first image IM1b transmitted from the first quarter-wave plate 240 back to the first quarter-wave plate 240.

When the first image sequentially passes through the first polarization unit 220, the lens array 230, the first quarter-wave plate 240 and the reflection unit 250, a first image IM1c, which is reflected by the reflection unit 250 back to the first quarter-wave plate 240, has a second circular polarization direction. When the first image IM1c having the second circular polarization direction passes through the first quarter-wave plate 240, the first quarter-wave plate 240 converts the first image IM1c reflected by the reflection unit 250 into a first image IM1d having a second linear polarization direction. Since the angle between the slow axis direction of the first quarter-wave plate 240 and the first linear polarization direction is 45 degrees or 135 degrees, an angle between the second linear polarization direction and the first linear polarization direction can be 90 degrees.

In other words, the linear polarization direction of the first image IM1a is turned by 90 degrees, so as to allow the first image IM1d having the second polarization direction to pass through the lens array 230. When the first image IM1d having the second polarization direction passes through the lens array 230, the lens array 230 refracts the plurality of sub-images having different visual angles to corresponding display directions respectively, so as to allow a user to see the corresponding sub-images from different viewing angles, so as to form a 3D image to the user visually.

According to the above arrangement, since an equivalent optical path length (OPL) in air from an image forming position of the real image of the first image IM1 to the lens array 230 while the first image arriving at the lens array 230 for second time is approximately equal to a focal length of the lens array 230, and the first image IM1 is reflected by the reflection unit 250 once, thus a distance between the lens array 230 and the reflection unit 250 can be shorter than the focal length of the lens array 230. That is, total thickness of all optical elements between the lens array 230 and the reflection unit 250 is less than the focal length of the lens array 230. Therefore, the focal length of the lens array 230 can be increased appropriately according to design requirements, so as to improve image forming quality of 3D images without greatly increasing the total thickness of all optical elements between the lens array 230 and the reflection unit 250.

In addition, in the above embodiment, when the lens array 230 is a one-dimensional lens array for refracting light along a horizontal direction, the 3D image display device can further comprise a scattering unit 260 disposed between the lens array 230 and the reflection unit 250. The scattering unit 260 can be a one-dimensional scattering unit for scattering the light along a vertical direction (for example, a scattering direction of the scattering unit 260 is perpendicular to a refraction direction of the lens array 230). Therefore, when a user U watches the first image IM1 of the 3D image display device 200, brightness of the first image in the vertical direction is more uniform, that is, users in different heights can see the first image with approximately the same brightness. When the user moves along the horizontal direction, the user can see corresponding 3D images from different viewing angles. However, the present invention is not limited to the above embodiment. The lens array 230 can also be a two-dimensional lens array.

Moreover, the lens array 230 can be a focal-length adjustable lens array, such as a liquid crystal lens array. When displaying a 3D image, the lens array 230 adjusts its focal length to become a convex lens array; and when displaying a 2D image, the lens array adjusts its focal length to become a concave lens array.

Figure 4:
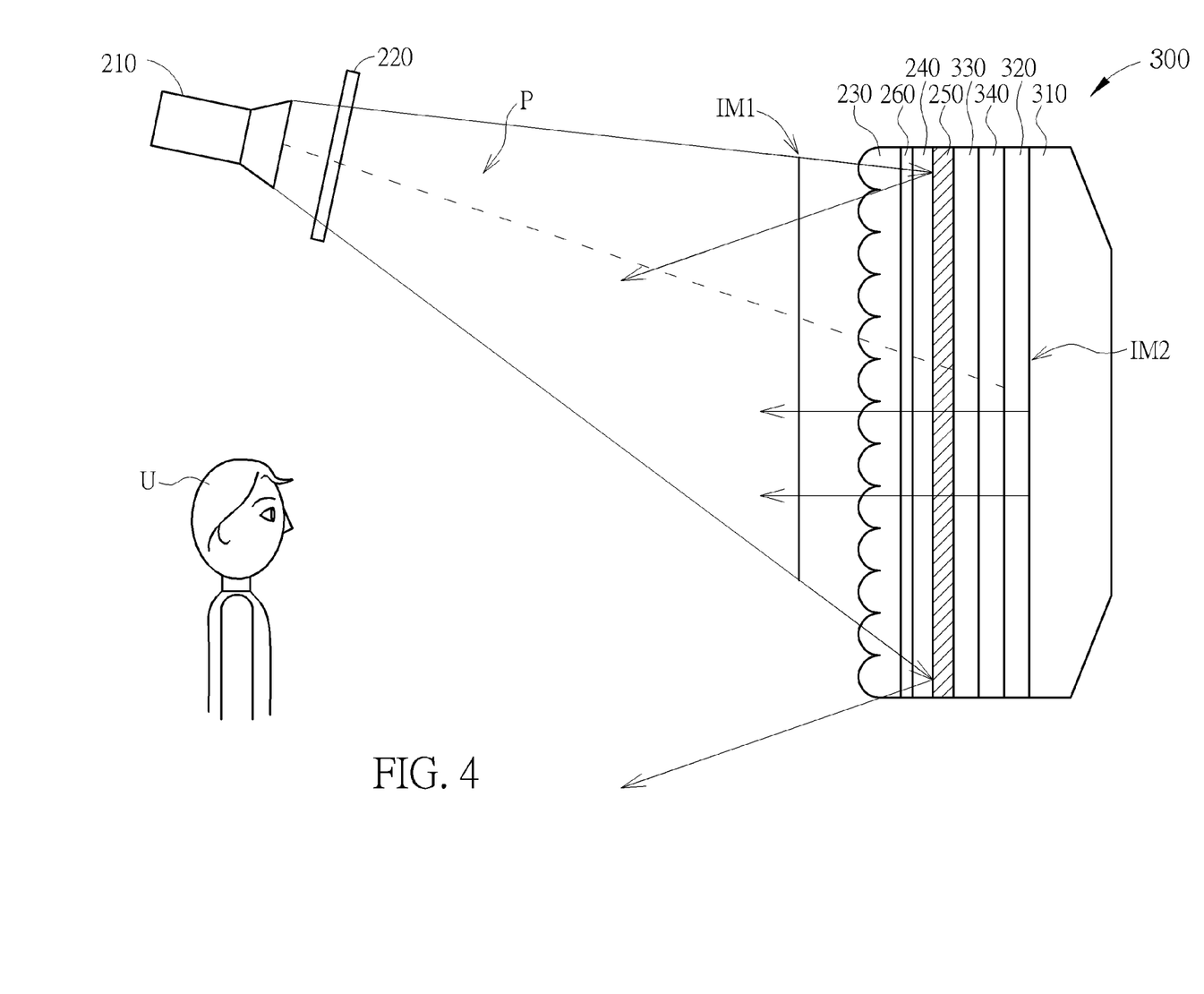
FIG. 4 is a diagram showing a 3D image display device according to a second embodiment of the present invention.

Please refer to FIG. 4. FIG. 4 is a diagram showing a 3D image display device according to a second embodiment of the present invention. As shown in FIG. 4, in addition to the image projection unit 210, the first polarization unit 220, the lens array 230, the first quarter-wave plate 240, and the reflection unit 250, a 3D image display device 300 of the present invention further comprises a flat panel display device 310, a second polarization unit 320, and a second quarter-wave plate 330. The flat panel display device 310 and the lens array 230 are respectively disposed at opposite sides of the reflection unit 250. The flat panel display device 310 is configured to generate a second image IM2. A real image of the second image IM2 is formed on a screen of the flat panel display device 310. The second polarization unit 320 is disposed between the flat panel display device 310 and the reflection unit 250 for linearly polarizing the second image IM2 to have a third linear polarization direction. The second quarter-wave plate 330 is disposed between the second polarization unit 320 and the reflection unit 250 for converting a polarization direction of an image between a linear polarization direction and a circular polarization direction. In the second embodiment of the 3D image display device of the present invention, the reflection unit 250 is a transflective reflection unit, that is, the first image IM1 projected by the image projection unit 210 is reflected by the reflection unit 250, and the second image IM2 generated by the flat panel display device 310 can pass through the reflection unit 250.

Figure 5:
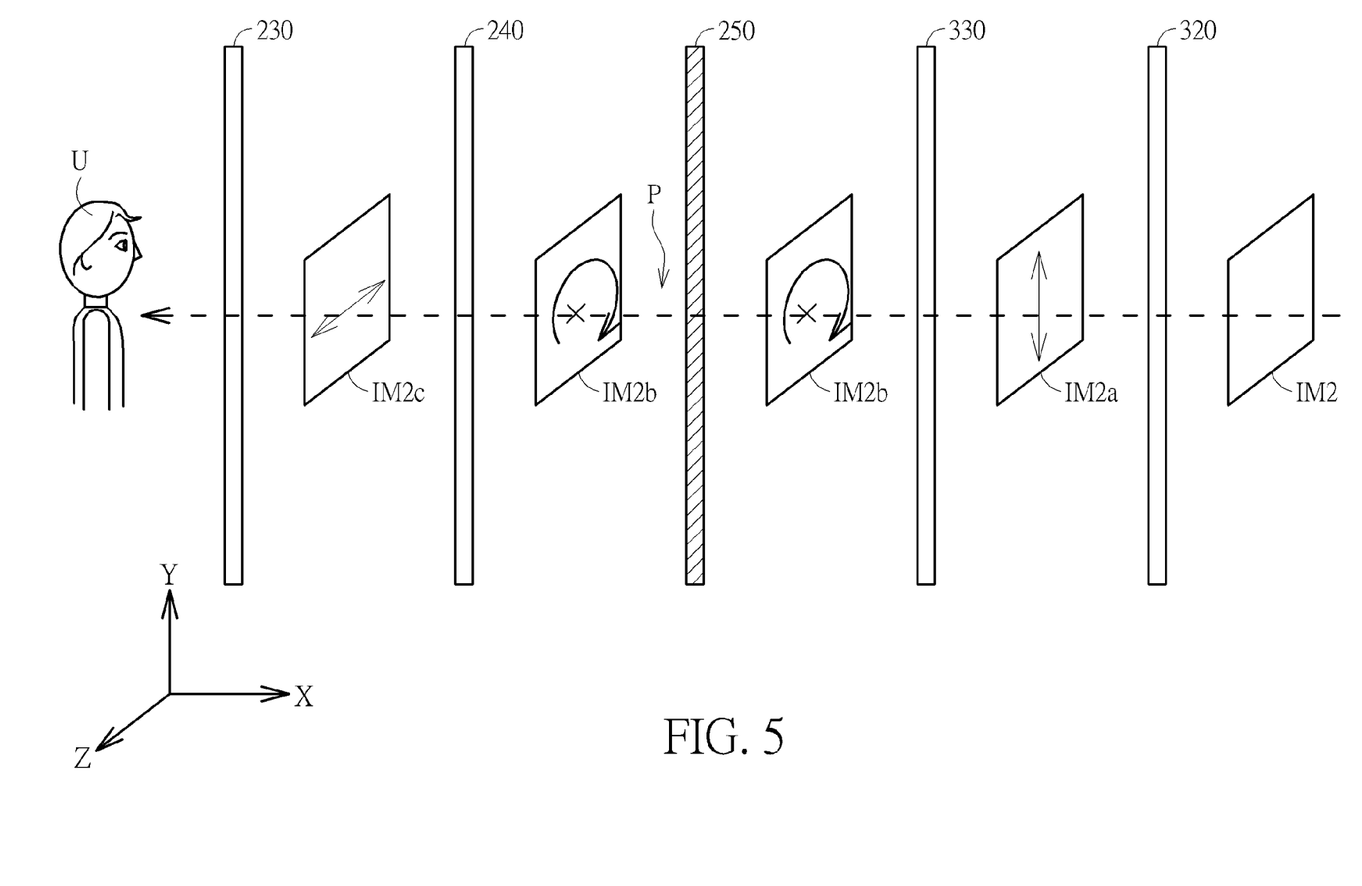
FIG. 5 is a diagram showing an embodiment of optical elements in FIG. 4 converting a polarization direction of the second image.

Please refer to FIG. 5, and refer to FIG. 4 as well. FIG. 5 is a diagram showing an embodiment of optical elements in FIG. 4 converting a polarization state of the second image. As shown in FIG. 5, when the first linear polarization direction is parallel to the third polarization direction, and the slow axis direction of the first quarter-wave plate 240 is parallel to a slow axis direction of the second quarter-wave plate 330, a second image IM2a having the third linear polarization direction (Y-axis direction) is converted by the second quarter-wave plate 330 into a second image IM2b having the second circular polarization direction. The second circular polarization direction is different from the first circular polarization direction. When the second image IM2b having the second circular polarization direction passes through the reflection unit 250, the second image IM2b having the second circular polarization direction is converted by the first quarter-wave plate 240 into a second image IM2c having the second linear polarization direction (Z-axis direction). When the second image IM2c having the second linear polarization direction passes through the lens array 230, the lens array 230 refracts the plurality of sub-images having different visual angles of the second image to corresponding display directions respectively, so as to allow the user to see the corresponding sub-images from different viewing angles, so as to form a 3D image to the user U visually.

In the embodiment of FIG. 5, the second image IM2 can be an auxiliary image of the first image IM1 in order to show other different views of the 3D image. As such, the 3D image display device 300 of the present invention can use a display element having lower resolution to display a 3D image having higher resolution.

Figure 6:
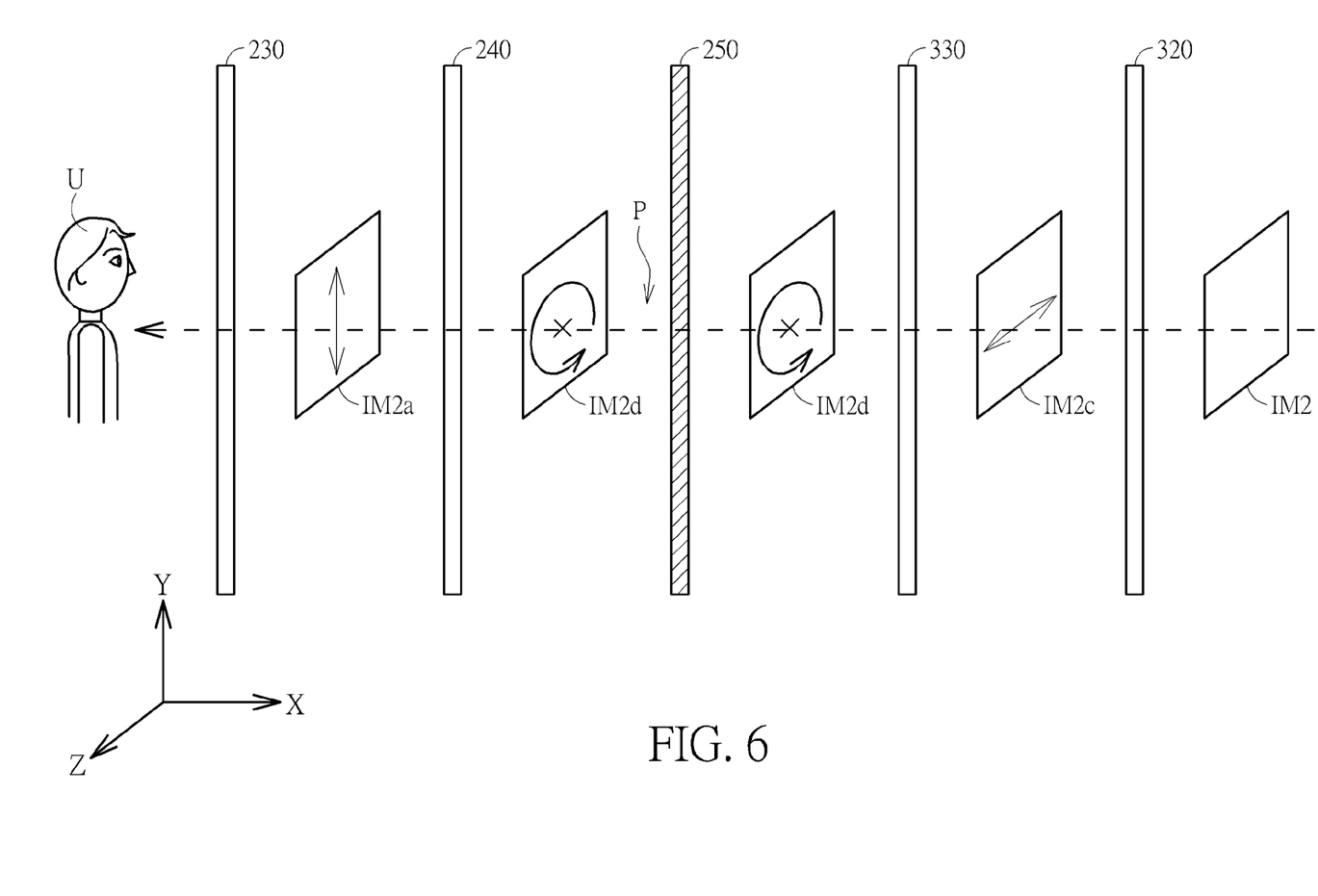
FIG. 6 is a diagram showing another embodiment of the optical elements in FIG. 4 converting the polarization direction of the second image.

On the other hand, the 3D image display device 300 of the present invention can use the image projection unit 210 to display a 3D image in a 3D display mode, and use the flat panel display device 310 to display a flat image in a 2D display mode. For example, please refer to FIG. 6, and refer to FIG. 4 as well. FIG. 6 is a diagram showing another embodiment of the optical elements in FIG. 4 converting the polarization direction of the second image. As shown in FIG. 6, when the first linear polarization direction is perpendicular to the third linear polarization direction, and the slow axis direction of the first quarter-wave plate 240 is parallel to the slow axis direction of the second quarter-wave plate 330, the second image IM2c having the third linear polarization direction (Z-axis direction) is converted by the second quarter-wave plate 330 into a second image IM2d having the first circular polarization direction. When the second image IM2d having the first circular polarization direction passes through the reflection unit 250, the second image IM2d having the first circular polarization direction is converted by the first quarter-wave plate 240 into a second image IM2a having the first linear polarization direction. When the second image IM2a having the first linear polarization direction passes through the lens array 230, the lens array 230 does not refract the second image IM2a.

Therefore, the 3D image display device 300 of the present invention can selectively turn on the image projection unit 210 or the flat panel display device 310 to display images according to requirements of the user, so as to switch between the 3D display mode and the 2D display mode.

Figure 7:
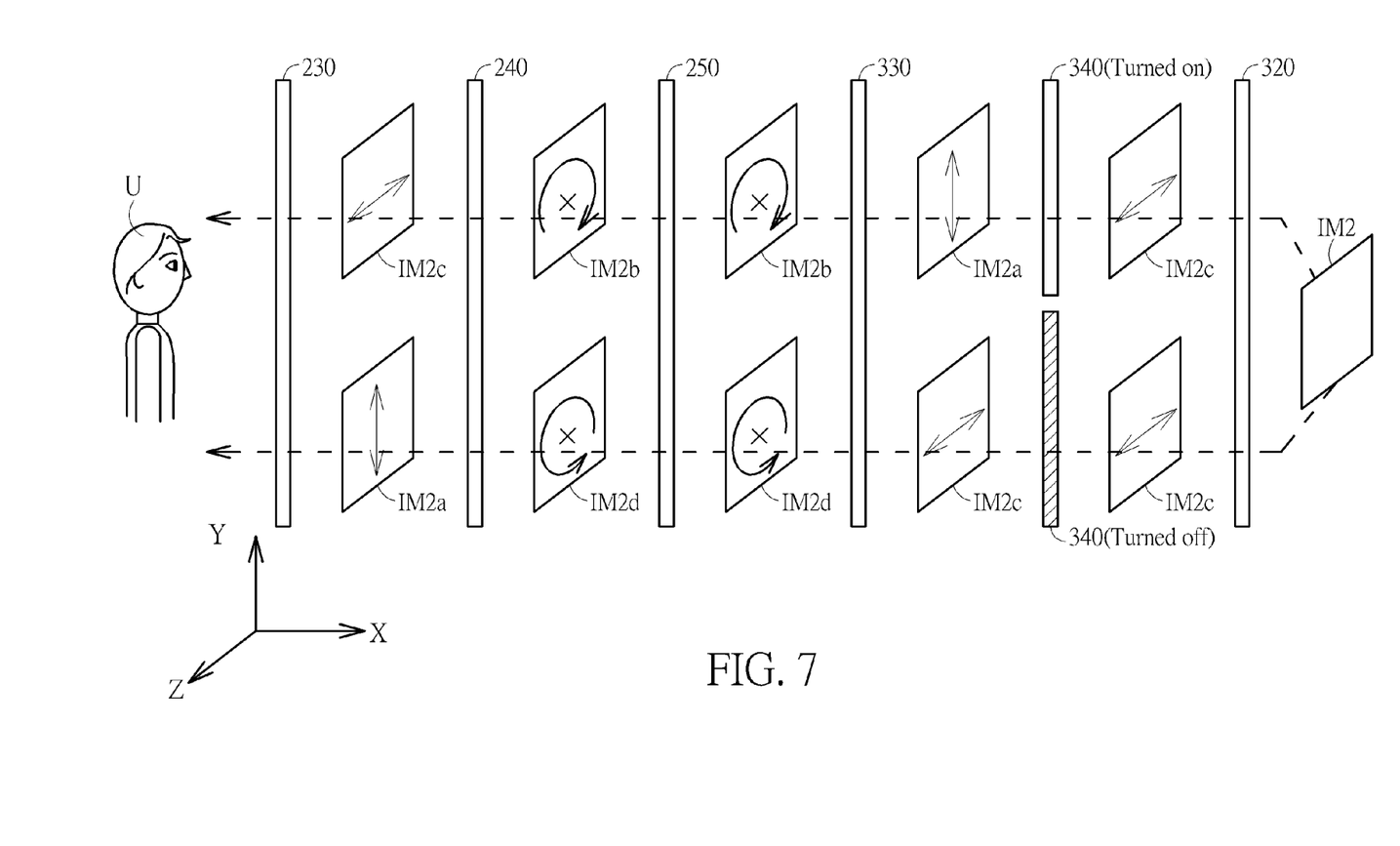
FIG. 7 is a diagram showing another embodiment of the optical elements in FIG. 4 converting the polarization direction of the second image.

In addition, please refer to FIG. 7, and refer to FIG. 4 as well. FIG. 7 is a diagram showing another embodiment of the optical elements in FIG. 4 converting the polarization direction of the second image. The 3D image display device 300 of the present invention can further comprise a switchable half-wave plate 340 disposed between the second polarization unit 320 and the second quarter-wave plate 330. When the switchable half-wave plate 340 is turned on, the switchable half-wave plate 340 changes the linear polarization direction of the second image IM2 by 90 degrees; and when the switchable half-wave plate 340 is turned off, the switchable half-wave plate 340 does not change the linear polarization direction of the second image IM2. As such, the 3D image display device 300 of the present invention can use the switchable half-wave plate 340 to control a display mode of the flat panel display device 310. For example, in the embodiment of FIG. 7, when the switchable half-wave plate 340 is turned on, the flat panel display device 310 works together with the image projection unit 210 to display 3D images; and when the switchable half-wave plate 340 is turned off, the flat panel display device 310 can be used to display 2D images.

According to the above arrangement, in addition to switching between the 3D display mode and the 2D display mode, the 3D image display device 300 of the present invention can display 3D images having higher resolution in the 3D display mode.

Figure 8:
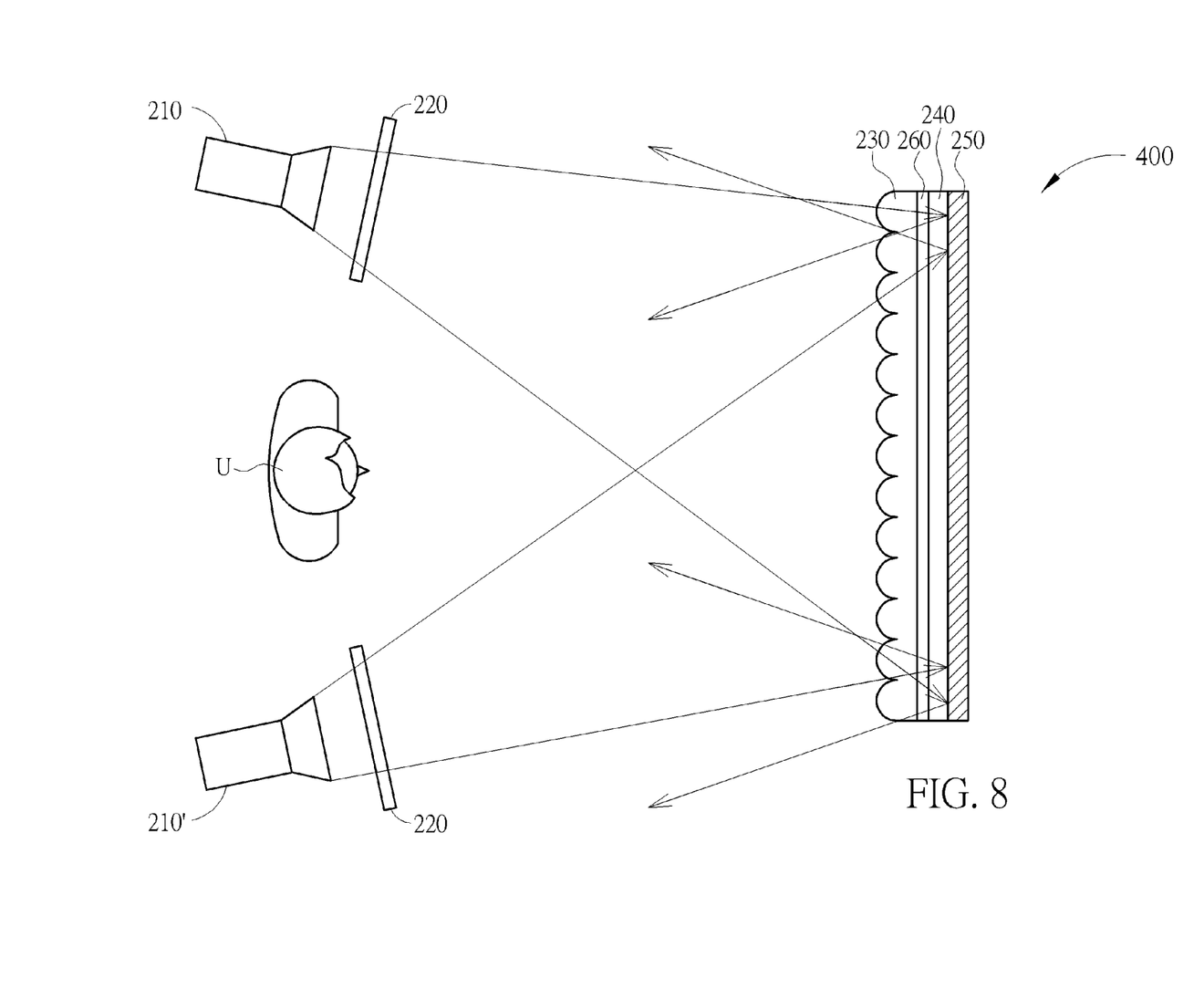
FIG. 8 is a diagram showing a 3D image display device according to a third embodiment of the present invention.

Please refer to FIG. 8. FIG. 8 is a diagram showing a 3D image display device according to a third embodiment of the present invention. As shown in FIG. 8, a 3D image display device 400 of the present invention comprises two image projection units 210, 210' respectively disposed at left and right sides of the lens array 230. Visual angles of images projected by the two image projection units 210, 210' are different, such that the viewing angle of the 3D image can be increased in order to solve the problem of insufficient viewing angle.

Figure 9:
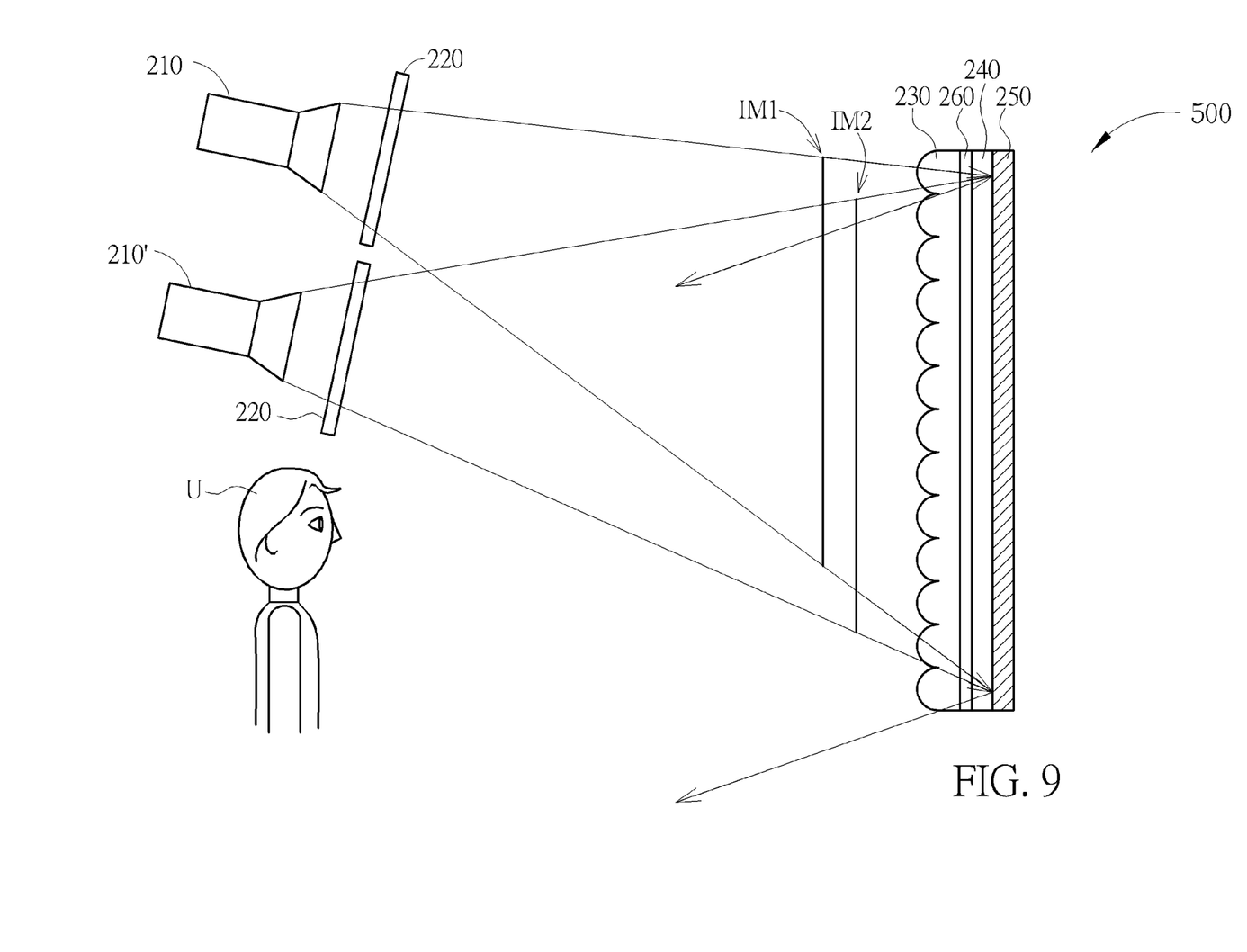
FIG. 9 is a diagram showing a 3D image display device according to a fourth embodiment of the present invention.

Please refer to FIG. 9. FIG. 9 is a diagram showing a 3D image display device according to a fourth embodiment of the present invention. As shown in FIG. 9, a 3D image display device 500 of the present invention comprises two image projection units 210, 210' for projecting real images having different image forming positions. For example, a distance between the real image of the first image IM1 projected by the image projection unit 210 and the lens array 230 is greater than a distance between the real image of the second image IM2 projected by the image projection unit 210' and the lens array 230. As such, a 3D image formed by the first image IM1 is a 3D image protruding outwardly from the reflection unit 250, and a 3D image formed by the second image IM2 is a 3D image recessed inwardly from the reflection unit 250. Therefore, the 3D image display device 500 of the present invention can simultaneously display the 3D images protruding outwardly and recessed inwardly from the reflection unit 250.

Figure 10:
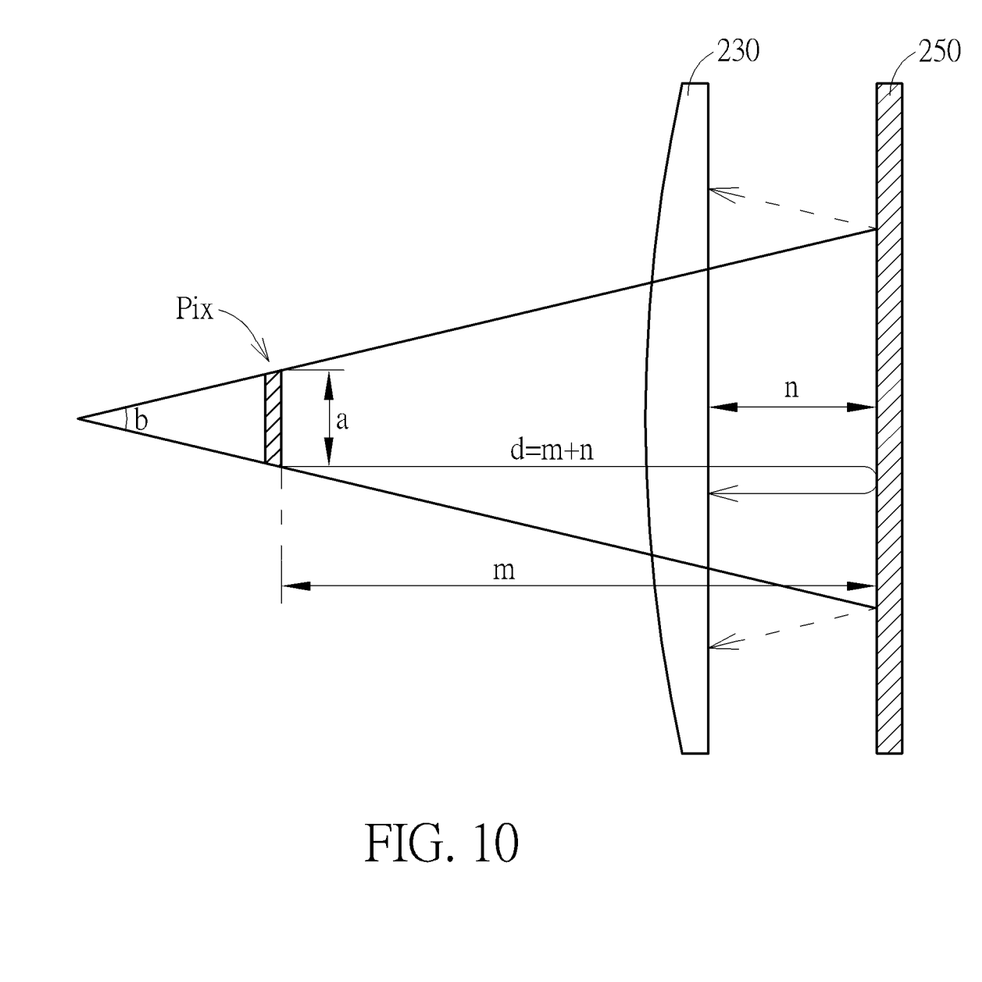
FIG. 10 is a diagram showing a geometric relationship between a pixel of the second image and the lens array in the above embodiments.

In addition, please refer to FIG. 10. FIG. 10 is a diagram showing a geometric relationship between a pixel of the second image IM2 and the lens array 230 in the above embodiments. As shown in FIG. 10, suppose a width of a pixel Pix (specifically, a horizontal width of a sub-pixel) of the real image of the second image IM2 is a, a light divergence angle of the pixel Pix (a maximum divergence angle of light emitted from the pixel) is b (specifically, a horizontal light divergence angle of a sub-pixel), an equivalent optical path length (OPL) in air of light of the pixel Pix passing through the lens array 230 from an image forming position of the real image and then being reflected to the lens array 230 via the reflection unit 250 is d (d=m+n), the pixel Pix of the real image of the second image IM2 can satisfy the following equation (1) in order to allow the 3D image recessed inwardly from the reflection unit 250 to be more clear:

$$\tan(b) \times d > a \quad (1)$$

When the pixel Pix of the real image of the second image IM2 satisfies the equation (1), the 3D image formed by the second image IM2 can be recessed inwardly from the reflection unit 250 more clear. On the other hand, when the 3D image display device of the present invention only comprises one image projection unit 210 and the first image IM1 of the image projection unit 210 is used to form the 3D image recessed inwardly from the reflection unit 250, a pixel of the real image of the first image IM1 can also satisfy the equation (1) in order to display the 3D image more clear. That is, if a value obtained by multiplying tan(b) and d is greater than a, the recessed 3D image is more clear.

On the other hand, the above equation (1) is not limited to be applied to a front-projection 3D image display device. The equation (1) can also be applied to a flat 3D image display device or a rear-projection 3D image display device. For example, when the equation (1) is applied to the flat 3D image display device, d of the equation (1) represents an equivalent OPL in air from an image forming position of the real image of the flat 3D image display device (screen surface) to the lens array 230. When a pixel of the real image of the flat 3D image display device satisfies the equation (1), an inwardly-recessed 3D image displayed by the flat 3D image display device can be more clear. When the equation (1) is applied to the rear-projection 3D image display device, d of the equation (1) represents an equivalent OPL in air from an image forming position of the real image of the rear-projection 3D image display device to the lens array 230. When a pixel of the real image of the rear-projection 3D image display device satisfies the equation (1), an inwardly-recessed 3D image displayed by the rear-projection 3D image display device can be more clear.

Figure 11:
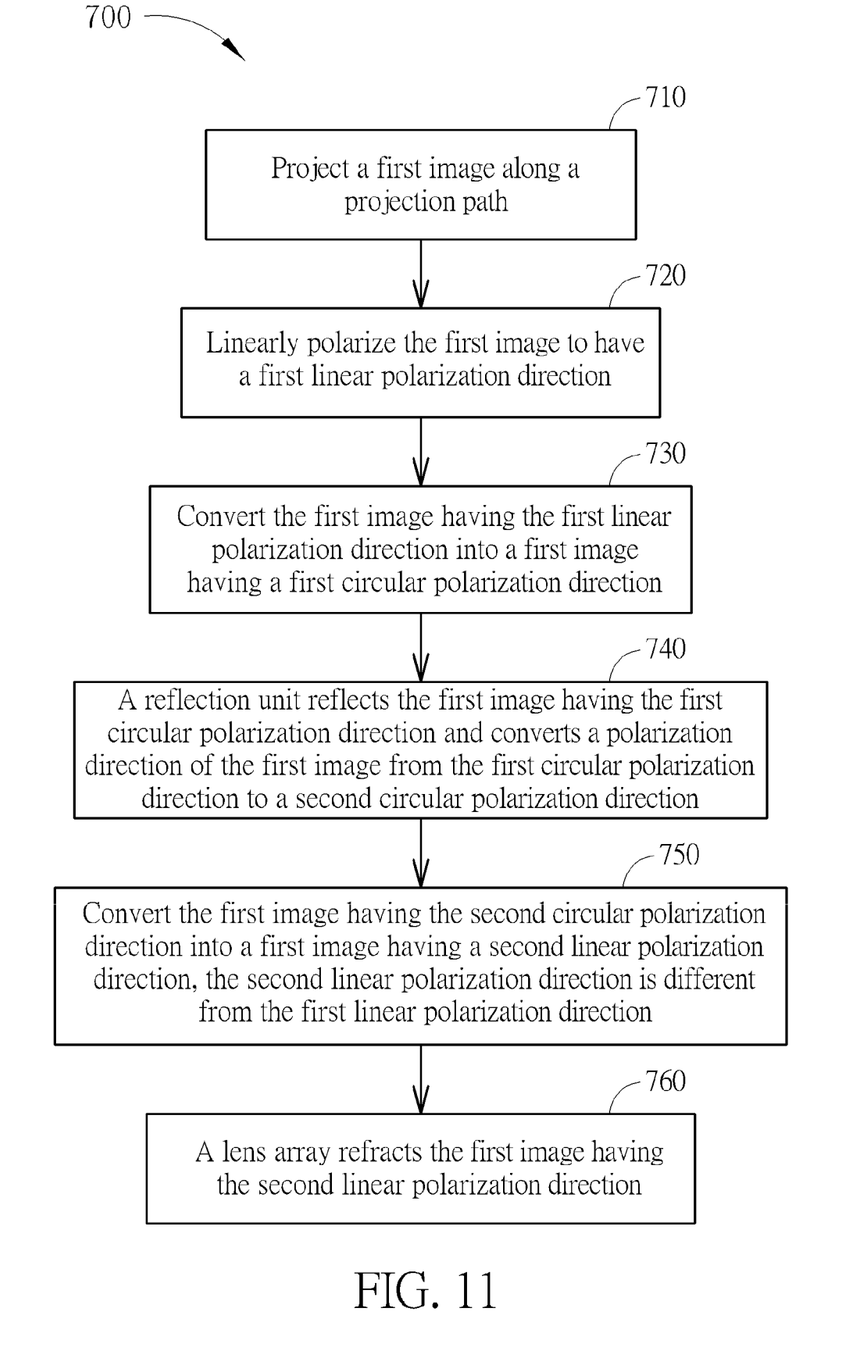
FIG. 11 is a flowchart showing a 3D image display method of the present invention.

Please refer to FIG. 11. FIG. 11 is a flowchart 700 showing a 3D image display method of the present invention. The flowchart of the 3D image display method of the present invention comprises the following steps:

Step 710: Project a first image along a projection path;

Step 720: Linearly polarize the first image to have a first linear polarization direction;

Step 730: Convert the first image having the first linear polarization direction into a first image having a first circular polarization direction;

Step 740: A reflection unit reflects the first image having the first circular polarization direction and converts a polarization direction of the first image from the first circular polarization direction to a second circular polarization direction;

Step 750: Convert the first image having the second circular polarization direction into a first image having a second linear polarization direction, the second linear polarization direction is different from the first linear polarization direction; and Step 760: A lens array refracts the first image having the second linear polarization direction.

In contrast to the prior art, the 3D image display device of the present invention can reduce total thickness of optical elements and improve image forming quality of the 3D image. In addition, the 3D image display device of the present invention can switch between the 3D display mode and the 2D display mode according to requirements of the user, and display the 3D image with higher resolution in the 3D display mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A 3D image display device, comprising:
an image projection unit configured to project a first image;
a first polarization unit disposed on a projection path of the first image for linearly polarizing the first image to have a first linear polarization direction;
a lens array disposed on the projection path of the first image for refracting an image having a second linear polarization direction, the second linear polarization direction being different from the first linear polarization direction;
a first quarter-wave plate disposed on the projection path of the first image for converting polarization direction of an image between a linear polarization direction and a circular polarization direction;
a reflection unit disposed on the projection path of the first image for reflecting the first image transmitted from the first quarter-wave plate back to the first quarter-wave plate, the reflection unit being a transflective element;
a flat panel display device, the flat panel display device and the lens array being respectively disposed at two opposite sides of the reflection unit, the flat panel display device being configured to generate a second image;
a second polarization unit disposed between the flat panel display device and the reflection unit for linearly polarizing the second image to have a third linear polarization direction; and
a second quarter-wave plate disposed between the second polarization unit and the reflection unit for converting a polarization direction of an image between a linear polarization direction and a circular polarization direction;
wherein the first image sequentially passes through the first polarization unit, the lens array, the first quarter-wave plate, and the reflection unit, and the first quarter-wave plate is configured to convert the first image reflected by the reflection unit to have the second linear polarization direction, so as to allow the first image having the second linear polarization direction to pass through the lens array;
wherein the second image generated by the flat panel display device passes through the reflection unit.

2. The display device of claim 1, wherein an angle between a slow axis direction of the first quarter-wave plate and the first linear polarization direction is 45 degrees or 135 degrees.

3. The display device of claim 2, wherein a pixel of a real image of the first image satisfies the following equation:

$$\tan(b) \times d > a;$$

wherein ∂ is a pixel width of the real image of the first image, b is a light divergence angle of the pixel, d is an equivalent optical path length in air of light of the pixel passing through the lens array from an image forming position of the real image of the first image and then being reflected to the lens array by the reflection unit.

4. The display device of claim 1, wherein the lens array is a one-dimensional lens array for refracting light along a horizontal direction, the display device further comprises a scattering unit disposed between the lens array and the reflection unit for scattering light along a vertical direction.

5. The display device of claim 1, wherein the first linear polarization direction is perpendicular to the third linear polarization direction, and a slow axis direction of the first quarter-wave plate is parallel to a slow axis direction of the second quarter-wave plate.

6. The display device of claim 1, wherein the first linear polarization direction is parallel to the third linear polarization direction, and a slow axis direction of the first quarter-wave plate is parallel to the slow axis direction of the second quarter-wave plate.

7. The display device of claim 1, further comprising a switchable half-wave plate disposed between the second polarization unit and the second quarter-wave plate.

8. The display device of claim 1, wherein a pixel of a real image of the first image satisfies the following equation:

$$\tan(b) \times d > \partial;$$

wherein ∂ is a pixel width of the real image of the first image, b is a light divergence angle of the pixel, d is an equivalent optical path length in air of light of the pixel passing through the lens array from an image forming position of the real image of the first image and then being reflected to the lens array by the reflection unit.

9. A 3D image display method, comprising:
projecting a first image along a projection path;
linearly polarizing the first image to have a first linear polarization direction, and allowing the first image having the first linear polarization direction to pass through a lens array without being refracted;
converting the first image having the first linear polarization direction into a first image having a first circular polarization direction;
reflecting the first image having the first circular polarization direction and converting polarization direction of the first image from the first circular polarization direction to a second circular polarization direction by a reflection unit;
converting the first image having the second circular polarization direction into a first image having a second linear polarization direction, the second linear polarization direction being different from the first linear polarization direction;
the lens array refracting the first image having the second linear polarization direction;
generating a second image;
converting the second image to make the second image having a third linear polarization direction;
converting the second image having the third linear polarization direction into a second image having a third circular polarization direction; and
transmitting the second image having the third circular polarization direction through the reflection unit.

10. The display method of claim 9, wherein a pixel of a real image of the first image satisfies the following equation:

$$\tan(b) \times d > \partial;$$

wherein ∂ is a pixel width of the real image of the first image, b is a light divergence angle of the pixel, d is an equivalent optical path length in air of light of the pixel passing through the lens array from an image forming position of the real image of the first image and then being reflected to the lens array by the reflection unit.

11. The display method of claim 9, wherein the third circular polarization direction is controlled to be opposite to the second circular polarization direction or the same as the second circular polarization direction.

* * * * *